(12) United States Patent
Samson et al.

(10) Patent No.: US 11,885,877 B2
(45) Date of Patent: Jan. 30, 2024

(54) SYSTEMS AND METHODS OF SPARSE ORTHOGONAL DIVERGING WAVE ULTRASOUND IMAGING

(71) Applicant: DALHOUSIE UNIVERSITY, Halifax (CA)

(72) Inventors: Christopher Samson, Halifax (CA); Jeremy Brown, Halifax (CA); Katherine Latham, Darthmouth (CA); Robert Adamson, Halifax (CA)

(73) Assignee: DALHOUSIE UNIVERSITY, Halifax (CA)

( * ) Notice: Subject to any disclaimer, the term of this patent is extended or adjusted under 35 U.S.C. 154(b) by 584 days.

(21) Appl. No.: 17/053,928

(22) PCT Filed: Apr. 24, 2019

(86) PCT No.: PCT/CA2019/050518
§ 371 (c)(1),
(2) Date: Nov. 9, 2020

(87) PCT Pub. No.: WO2019/213744
PCT Pub. Date: Nov. 14, 2019

(65) Prior Publication Data
US 2021/0263151 A1    Aug. 26, 2021

Related U.S. Application Data

(60) Provisional application No. 62/669,120, filed on May 9, 2018.

(51) Int. Cl.
*G01S 15/89* (2006.01)
*G01S 7/52* (2006.01)

(52) U.S. Cl.
CPC ...... *G01S 15/8904* (2013.01); *G01S 7/52085* (2013.01); *G01S 15/8915* (2013.01); *G01S 15/8959* (2013.01)

(58) Field of Classification Search
None
See application file for complete search history.

(56) References Cited

U.S. PATENT DOCUMENTS

| | | | |
|---|---|---|---|
| 5,851,187 A | 12/1998 | Thomas, III et al. | |
| 6,050,947 A * | 4/2000 | Rhyne | G01S 7/52038 |
| | | | 600/458 |

(Continued)

FOREIGN PATENT DOCUMENTS

| | | | | |
|---|---|---|---|---|
| DE | 69936247 T2 * | 2/2008 | ........... | A61B 8/4483 |
| EP | 1074854 A1 * | 2/2001 | ............. | G01S 17/36 |

(Continued)

OTHER PUBLICATIONS

Harrison, Tyler, Alexander Sampaleanu, and Roger J. Zemp. "S-sequence spatially-encoded synthetic aperture ultrasound imaging [correspondence]." IEEE transactions on ultrasonics, ferroelectrics, and frequency control 61.5 (2014): 886-890. (Year: 2014).*

(Continued)

*Primary Examiner* — Isam A Alsomiri
*Assistant Examiner* — Jonathan D Armstrong
(74) *Attorney, Agent, or Firm* — HILL & SCHUMACHER

(57) ABSTRACT

Encoded transmit signals are provided to an ultrasound array such diverging ultrasound waves are sequentially transmitted. Each diverging ultrasound wave is generated by a respective set of encoded transmit signals, where each set of encoded transmit signals is encoded by a respective row of an N×N invertible orthogonal matrix. Only a selected subset of M rows, with N<M, is employed to encode the transmit signals. Sets of receive signals detected in response to the transmitted diverging ultrasound waves are decoded via a transposed matrix generated based on the invertible orthogonal matrix, with each set of decoded receive signals being associated with insonification via a subset of the ultrasound (Continued)

array elements in the fixed aperture. Synthetic aperture beamforming is performed on the decoded receive signals to generate an ultrasound image.

28 Claims, 14 Drawing Sheets

(56) References Cited

U.S. PATENT DOCUMENTS

| | | | |
|---|---|---|---|
| 6,279,399 B1* | 8/2001 | Holm | G01S 15/8927 73/628 |
| 6,748,098 B1* | 6/2004 | Rosenfeld | G06T 3/4007 600/410 |
| 9,941,989 B2* | 4/2018 | Zemp | H04J 13/0022 |
| 11,255,965 B2* | 2/2022 | Brown | G01S 15/8959 |
| 11,520,043 B2* | 12/2022 | Kruse | G01S 7/52028 |
| 11,596,388 B2* | 3/2023 | Wegner | G01S 15/8952 |
| 11,607,192 B2* | 3/2023 | Wegner | G01S 15/8913 |
| 2004/0236219 A1* | 11/2004 | Liu | G01S 7/52034 600/443 |
| 2011/0146371 A1* | 6/2011 | Roy | A61B 8/58 73/1.79 |
| 2013/0211254 A1* | 8/2013 | Aase | G01S 7/52026 600/449 |
| 2014/0340351 A1* | 11/2014 | Forlines | G06F 3/0416 345/174 |
| 2016/0065323 A1* | 3/2016 | Zemp | G01S 13/90 342/25 A |
| 2016/0270763 A1* | 9/2016 | Hayes | G01S 15/8934 |
| 2020/0041644 A1* | 2/2020 | Brown | G01S 15/8993 |

FOREIGN PATENT DOCUMENTS

| | | | | |
|---|---|---|---|---|
| EP | 3839561 A1 * | 6/2021 | | G01S 13/505 |
| WO | WO-8601057 A1 * | 2/1986 | | |
| WO | WO-2004099814 A1 * | 11/2004 | | A61B 8/5284 |
| WO | WO-2018107299 A1 * | 6/2018 | | G01S 15/8925 |
| WO | WO-2021137191 A1 * | 7/2021 | | G01S 13/42 |

OTHER PUBLICATIONS

WO-2018107299-A1. English Machine Translation. (Year: 2018).*
EP-3839561-A1. English Machine Translation. (Year: 2021).*
WO-2021137191-A1. English Machine Translation. (Year: 2021).*
WO-8601057-A1. English Machine Translation. (Year: 1986).*
DE-69936247-T2. English Machine Translation. (Year: 2008).*
EP-1074854-A1. English Machine Translation. (Year: 2001).*
WO-2004099814-A1. English Machine Translation. (Year: 2004).*
G. Montaldo, M. Tanter, J. Bercoff, N. Benech, and M. Fink, "Coherent plane-wave compounding for very high frame rate ultrasonography and transient elastography," IEEE Trans. Ultrason. Ferroelectr. Freq. Control, vol. 56, No. 3, pp. 489-506, Mar. 2009.
C. Papadacci, M. Pernot, M. Couade, M. Fink, M. Tanter, "High-Contrast Ultrafast Imaging of the Heart," IEEE Trans. Ultrason. Ferroelectr. Freq. Control, vol. 61, No. 2, pp. 288-301, Feb. 2014.
G. Lockwood, J. Talman, S. Brunke, "Real-Time 3-D Ultrasound Imaging Using Sparse Synthetic Aperture Beamforming," IEEE Trans. Ultrason. Ferroelectr. Freq. Control, vol. 45, No. 4, pp. 980-988, Jul. 1998.
R. Chiao, L. Thomas, S. Silverstein, "Sparse Array Imaging with Spatially-Encoded Transmits," Proc IEEE Ultrasonic Symposium. Ferroelectr. Freq. Control, Jul. 1997.
T. Harrison, A. Sampaleanu, R. Zemp, "S-Sequence Spatially-Encoded Synthetic Aperture Ultrasound Imaging," IEEE Trans. Ultrason. Ferro. and Freq. Cont. 61, 2014.
C. Creoici, T. Harrison, R. Zemp, "Fast Orthogonal Row-Column Electronic Scanning With Top-Orthogonal-to-Bottom Electrode Arrays," IEEE Trans. Ultrason. Ferroelectr. Freq. Control, vol. 64, No. 6, pp. 1009-1014, Jun. 2017.
Gong et al., "Ultrafast Synthetic Transmit Aperture Imaging Using Hadamard-Encoded Virtual Sources with Overlapping Sub-apertures" IEEE Transactions on Medical Imaging, vol. 36 No. 6 Jun. 2017 p. 1372-1381.
Tiran et al., "Multiplane wave imaging increases signal-to-noise ratio in ultrafast ultrasound imaging", IOP Publishing, Physics in Medicine & Biology, vol. 60, 2015, p. 8549-8566.
Liu et al., "Compressed sensing based synthetic transmit aperture for phased array imaging", IEEE, 2017 IEEE International Ultrasonics Symposium (IUS), 2017, Washington, DC, USA, Sep. 6-9, 2017, added to IEEE Xplore, Nov. 2, 2017.
International Search Report dated Aug. 1, 2019, for PCT/CA2019/050518 filed Apr. 24, 2019.

* cited by examiner

Transmit element 1

Transmit element 2

Transmit element N

Receive on all elements

Receive on all elements

Receive on all elements

TABLE. I SNR comparison relative to focused imaging with 512 pulses.

| # TX | SODWI – Focused SNR (dB) | DW - Focused SNR (dB) |
|---|---|---|
| 64 | +3.2 | N/A |
| 32 | 0.0 | -1.6 |
| 16 | -3.0 | -2.2 |
| 8 | -5.0 | -4.0 |
| 4 | -7.0 | -5.6 |

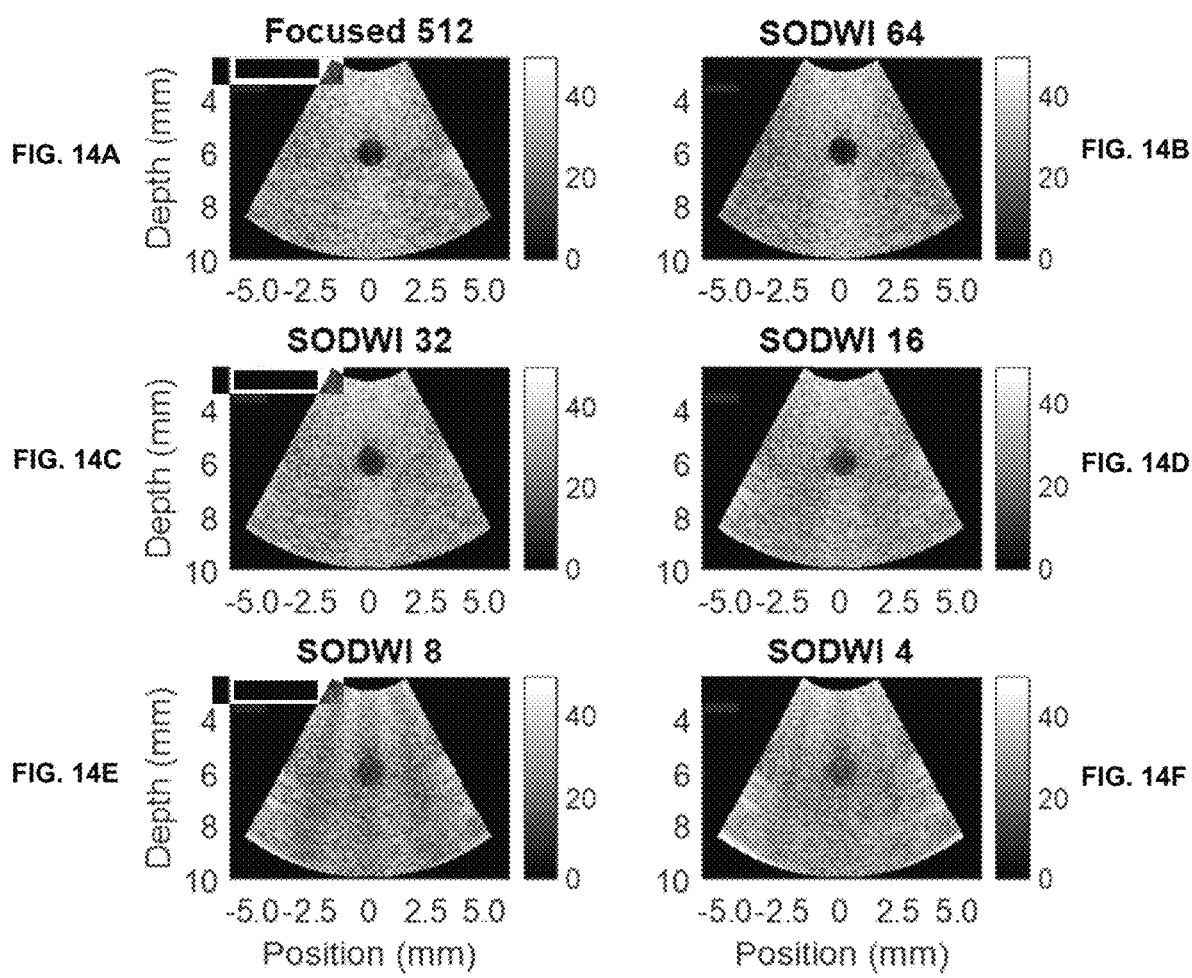

SYSTEMS AND METHODS OF SPARSE ORTHOGONAL DIVERGING WAVE ULTRASOUND IMAGING

CROSS-REFERENCE TO RELATED APPLICATION

This application is a National Phase application claiming the benefit of the international PCT Patent Application No. PCT/CA2019/050518, filed on Apr. 24, 2019, in English, which claims priority to U.S. Provisional Patent Application No. 62/669,120, titled "SYSTEMS AND METHODS OF SPARSE ORTHOGONAL DIVERGING WAVE ULTRASOUND IMAGING" and filed on May 9, 2018, the entire contents of which are incorporated herein by reference.

BACKGROUND

The present disclosure relates to ultrasound beamforming and ultrasound imaging. More particularly, the present disclosure relates to ultrafast ultrasound imaging.

Ultrafast imaging techniques have emerged as having an advantage over conventional B-mode imaging techniques. Ultrafast imaging opens applications where frame rates of over 1000 frames per second (fps) are required to resolve various phenomena, such as, for example, shear and mechanical wave propagation. The measurement and analysis of such waves offer clinically significant insight into the physiology of tissue that cannot be obtained from conventional B-mode images.

Ultrafast imaging techniques, such as plane wave imaging, diverging wave imaging, and synthetic aperture imaging, transmit unfocused ultrasound waves into a medium. These emissions weakly insonify the entire image, thus images can be created from a small number of emissions. Alternatively, previous B-mode imaging methods implementing transmit focusing techniques typically require 100s of insonifications to create a complete B-mode image. Intuitively, one emission from an ultrafast imaging technique will not yield the same quality image as the transmit focusing case. To match image quality, a transmit focus is generated synthetically by coherently compounding multiple insonifications whereby successive insonifications are effectively emitted from different locations.

Plane wave imaging offers a distinct speed advantage by minimizing the number of insonifications required to generate an image. During receive beamforming, digital focusing is applied to all of the space in the image window, with the result that as few as a single insonification can be employed to generate an image.

In the simple case where a single plane wave is emitted into the medium, there is only a one-way focus on receive, and thus image quality is significantly reduced compared to conventional image reconstruction. In order to improve the image quality, a transmit focus must be built through successive insonifications. For plane wave imaging the transmit focus is built by coherently compounding plane waves emitted at different angles α, relative to the transmit aperture. Therefore the time between excitation and a point in the medium is given by:

$$\tau_{ec}(\alpha,x,z) = (z \cos \alpha + x \sin \alpha)/c, \quad (1)$$

and the receive time back to the transducer at $x_1$ is given by:

$$\tau_{ec}(x_1,x,z) = (z^2 + (x-x_1)^2)/c, \quad (2)$$

where $x_1$ is the position of the element on the array. The images generated from each plane wave are then coherently summed to generate a final compounded image. Compounding is the key feature of plane wave imaging which gives it its performance advantage. By exciting the medium from various angles, the interference on receive focusing from objects outside of the focus will not coherently sum together across each frame. This reduces the amount of interference superimposed onto the receive focus.

FIGS. 1A-D illustrate how a compounding focus can be built from several plane waves emitted at different angles. FIG. 1A illustrates the phasing of a transducer array to generate a plurality of plane waves (the waves would be sequentially generated according to a set of transmit events) having different angles. FIGS. 1B-1D illustrate the coherent compounding of the receive signals collected in response to each plane wave transmit event, in order to generate image data for different image foci. It has been found that images created from plane wave compounding can exhibit image improvements, matching and in some respects exceeding conventional beamforming techniques. For linear arrays, it has been shown that plane wave imaging yields benefits for contrast, SNR, and lateral resolution, while achieving higher frame rates.

In diverging wave imaging, virtual point sources are synthetically created behind the array aperture. The lateral position of the virtual point source can be translated behind the array, effectively insonifying the medium from a new spatial location. Successive insonifications can then be coherently compounded together to increase image quality. This imaging technique can generate an image from a single insonification, similar to the plane wave imaging modality described above.

In order to produce diverging waves, the elements on the array are excited to mimic a virtual point source behind the imaging array. As in the preceding example case of plane wave imaging, the image quality is improved by coherently compounding images generated from different virtual point source positions behind the array. The generation of diverging wavefronts having different virtual point source locations is illustrated in FIG. 2A. The different wavefronts can be coherently compounded, as shown in FIGS. 2B-2D, to perform receive focusing at different focal locations.

Similarly, synthetic aperture imaging, shown in FIGS. 3A and 3B, effectively creates point sources at each of the elements during transmission. For each insonification, one element is activated. This process is typically repeated for every element in the aperture. As in the proceeding examples of plane and diverging wave imaging, an image is generated from pulsing each individual element, where they are compounded together to create a transmit focus and improve image quality.

SUMMARY

Encoded transmit signals are provided to an ultrasound array such diverging ultrasound waves are sequentially transmitted. Each diverging ultrasound wave is generated by a respective set of encoded transmit signals, where each set of encoded transmit signals is encoded by a respective row of an N×N invertible orthogonal matrix. Only a selected subset of M rows, with M<N, is employed to encode the transmit signals. Sets of receive signals detected in response to the transmitted diverging ultrasound waves are decoded via a transposed matrix generated based on the invertible orthogonal matrix, with each set of decoded receive signals being associated with insonification via a subset of the ultrasound array elements in the fixed aperture. Synthetic aperture beamforming is performed on the decoded receive signals to generate an ultrasound image.

Accordingly, in one aspect, there is provided an ultrasound imaging system comprising:
  an ultrasound array comprising a plurality of ultrasound array elements;
  control and processing circuitry operably connected to said plurality of ultrasound array elements, said control and processing circuitry comprising a processor and a memory, wherein said processor is configured to execute instructions stored in said memory for performing the steps of:
    controlling the delivery of encoded transmit signals to the ultrasound array to sequentially transmit a plurality of diverging ultrasound waves, wherein each diverging ultrasound wave is generated by transmitting a respective set of encoded transmit signals to a fixed aperture of said ultrasound array, the fixed aperture consisting of N elements of the ultrasound array;
    wherein each set of encoded transmit signals is encoded by a respective row of an N×N invertible orthogonal matrix such that only a selected subset of M rows of the invertible orthogonal matrix is employed to encode the transmit signals, wherein M<N;
  said processor being further configured to process sets of receive signals received by the ultrasound array, wherein each set of receive signals is associated with transmission of a respective diverging wave, by:
    decoding the sets of receive signals with a transposed matrix to obtain a plurality of sets of decoded receive signals, wherein the transposed matrix is generated based on the invertible orthogonal matrix such that each set of decoded receive signals is associated with insonification via a subset of the ultrasound array elements in the fixed aperture; and
    performing synthetic aperture beamforming on the plurality of sets of decoded receive signals to generate an ultrasound image.

In another aspect, there is provided a method of performing ultrasound imaging, the method comprising:
  delivering encoded transmit signals to an ultrasound array comprising a plurality of ultrasound array elements to sequentially transmit a plurality of diverging ultrasound waves, such that each diverging ultrasound wave is generated by transmitting a respective set of encoded transmit signals to a fixed aperture of the ultrasound array, the fixed aperture consisting of N elements of the ultrasound array;
  wherein each set of encoded transmit signals is encoded by a respective row of an N×N invertible orthogonal matrix such that only a selected subset of M rows of the invertible orthogonal matrix is employed to encode the transmit signals, wherein M<N;
  detecting receive signals from the ultrasound array in response to the transmitted diverging waves, wherein each set of receive signals is associated with transmission of a respective diverging wave;
  decoding the sets of receive signals with a transposed matrix to obtain a plurality of sets of decoded receive signals, wherein the transposed matrix is generated based on the invertible orthogonal matrix such that each set of decoded receive signals is associated with insonification via a subset of the ultrasound array elements in the fixed aperture; and
  performing synthetic aperture beamforming on the plurality of sets of decoded receive signals to generate an ultrasound image.

In another aspect, there is provided an ultrasound imaging system comprising:
  an ultrasound array comprising a plurality of ultrasound array elements;
  control and processing circuitry operably connected to said plurality of ultrasound array elements, said control and processing circuitry comprising a processor and a memory, wherein said processor is configured to execute instructions stored in said memory for performing the steps of:
    controlling the delivery of encoded transmit signals to the ultrasound array to sequentially transmit a plurality of diverging ultrasound waves, wherein each diverging ultrasound wave is generated by transmitting a respective set of encoded transmit signals to a fixed aperture of said ultrasound array, the fixed aperture consisting of N elements of the ultrasound array;
    wherein each set of encoded transmit signals is encoded by a respective row of an N×N invertible orthogonal matrix such that only a selected subset of M rows of the invertible orthogonal matrix is employed to encode the transmit signals, wherein M<N;
  said processor being further configured to process sets of receive signals received by the ultrasound array, wherein each set of receive signals is associated with transmission of a respective diverging wave, by:
    decoding the sets of receive signals with a transposed matrix to obtain a plurality of sets of decoded receive signals, wherein the transposed matrix is generated based on the invertible orthogonal matrix such that each set of decoded receive signals is associated with insonification via a subset of the ultrasound array elements in the fixed aperture; and
    performing synthetic aperture beamforming on the plurality of sets of decoded receive signals to generate an ultrasound image;
    wherein synthetic aperture beamforming is performed, for a given location, such that at least one given set of decoded receive signals associated with insonification via a given subset of the ultrasound array elements is processed by:
      for each ultrasound array element of the given subset of the ultrasound array elements:
        determining a set of round-trip times of flight between the ultrasound array element, the location, and the ultrasound array elements of the fixed aperture; and
        respectively applying the set of round-trip times of flight to the given set of decoded receive signals;
      whereby repeated use of the given set of decoded receive signals for the calculation of times-of-flight on a per-element basis when performing beamforming reduces grating lobe artifacts that would otherwise be associated with grouping array elements during time-of-flight calculations.

In another aspect, there is provided a method of performing ultrasound imaging, the method comprising:
  delivering encoded transmit signals to an ultrasound array comprising a plurality of ultrasound array elements to sequentially transmit a plurality of diverging ultrasound waves, such that each diverging ultrasound wave is generated by transmitting a respective set of encoded transmit signals to a fixed aperture of the ultrasound array, the fixed aperture consisting of N elements of the ultrasound array;

wherein each set of encoded transmit signals is encoded by a respective row of an N×N invertible orthogonal matrix such that only a selected subset of M rows of the invertible orthogonal matrix is employed to encode the transmit signals, wherein M<N;

detecting receive signals from the ultrasound array in response to the transmitted diverging waves, wherein each set of receive signals is associated with transmission of a respective diverging wave;

decoding the sets of receive signals with a transposed matrix to obtain a plurality of sets of decoded receive signals, wherein the transposed matrix is generated based on the invertible orthogonal matrix such that each set of decoded receive signals is associated with insonification via a subset of the ultrasound array elements in the fixed aperture; and performing synthetic aperture beamforming on the plurality of sets of decoded receive signals to generate an ultrasound image;

wherein synthetic aperture beamforming is performed, for a given location, such that at least one given set of decoded receive signals associated with insonification via a given subset of the ultrasound array elements is processed by:

for each ultrasound array element of the given subset of the ultrasound array elements:

determining a set of round-trip times of flight between the ultrasound array element, the location, and the ultrasound array elements of the fixed aperture; and respectively applying the set of round-trip times of flight to the given set of decoded receive signals;

whereby repeated use of the given set of decoded receive signals for the calculation of times-of-flight on a per-element basis when performing beamforming reduces grating lobe artifacts that would otherwise be associated with grouping array elements during time-of-flight calculations.

A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, in which:

FIGS. 14A-14F provide a comparison of experimentally-obtained images of anechoic inclusions inside a tissue mimicking phantom. FIG. 14A shows a focused image that is provided for reference, while FIGS. 14B-14F show sparse orthogonal diverging wave images obtained with 64, 32, 16, 8, and 4 codes.

DETAILED DESCRIPTION

Figures 1A, 1B, 1C, 1D:
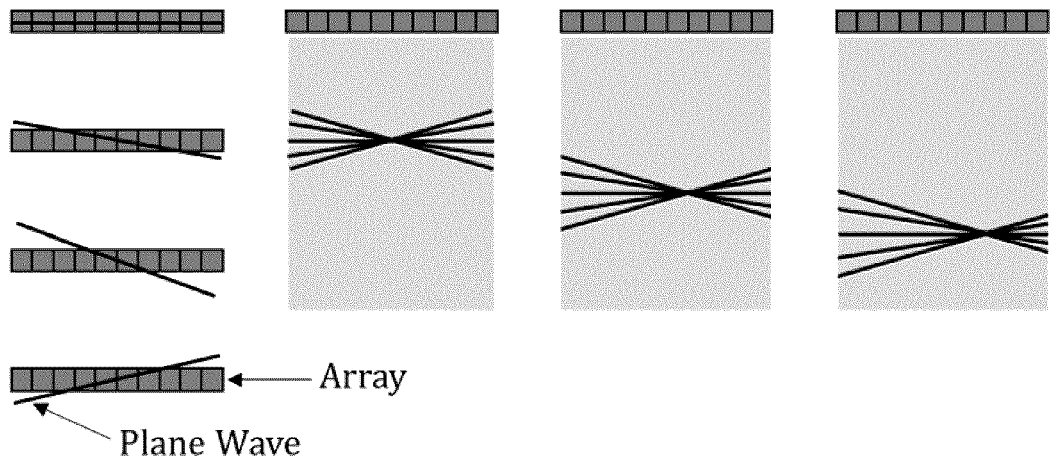
FIGS. 1A-1D illustrate the generation of plane waves at a plurality of angles, and the coherent compounding of the plane waves for ultrasound imaging.
Figures 2A, 2B, 2C, 2D:
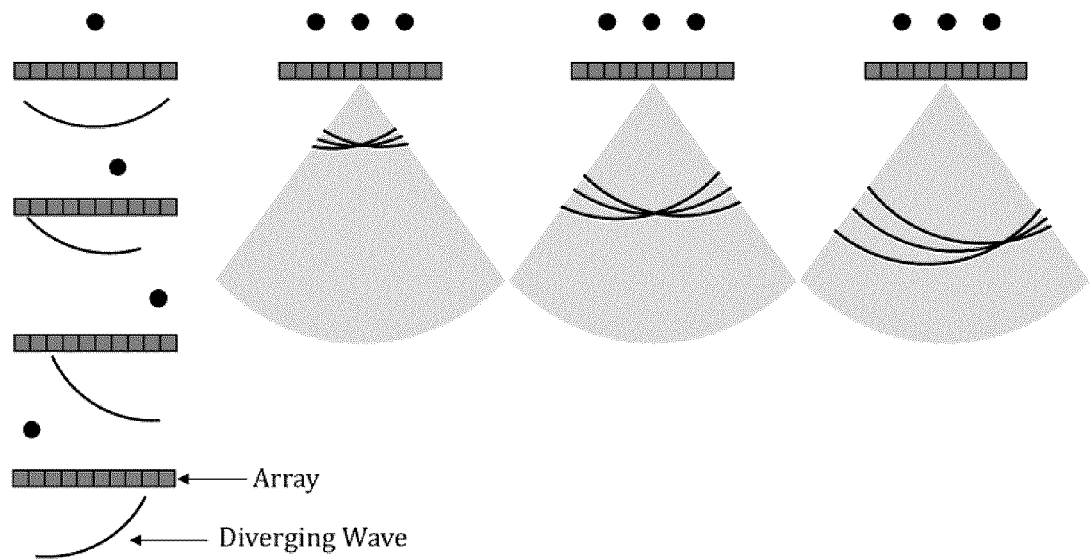
FIGS. 2A-2D illustrate the generation of diverging waves having a plurality of virtual foci, and the coherent compounding of the diverging waves for ultrasound imaging.
Figure 3A:
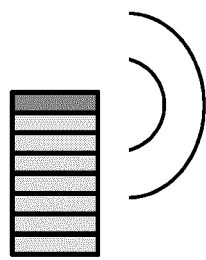
FIGS. 3A-3B illustrate the transmit and receive sequence that is employed during synthetic aperture imaging. Diverging waves are sequentially transmitted by individual array elements. The receive signals are detected across the aperture for each transmit event, dynamically beamformed, and processed together to generate an ultrasound image.
Figure 3A:
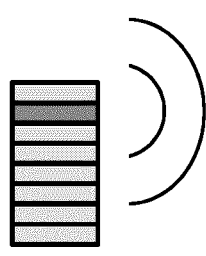
Figure 3A:
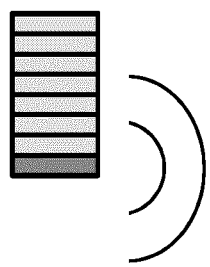
Figure 3B:
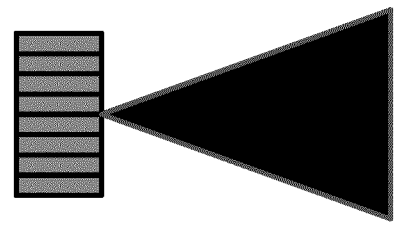
Figure 3B:
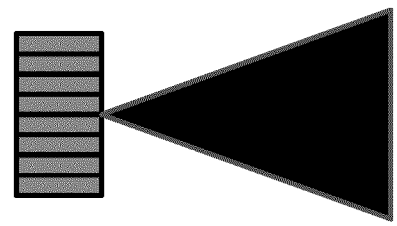
Figure 3B:
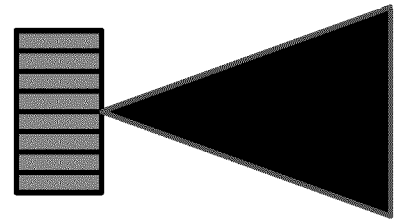

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms "comprises" and "comprising" are to be construed as being inclusive and open ended, and not exclusive. Specifically, when used in the specification and claims, the terms "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions. Unless otherwise specified, the terms "about" and "approximately" mean plus or minus 25 percent or less.

It is to be understood that unless otherwise specified, any specified range or group is as a shorthand way of referring to each and every member of a range or group individually, as well as each and every possible sub-range or sub-group encompassed therein and similarly with respect to any sub-ranges or sub-groups therein. Unless otherwise specified, the present disclosure relates to and explicitly incorporates each and every specific member and combination of sub-ranges or sub-groups.

As used herein, the term "on the order of", when used in conjunction with a quantity or parameter, refers to a range spanning approximately one tenth to ten times the stated quantity or parameter.

As described above, imaging methods such as plane wave imaging, diverging wave imaging, and synthetic aperture imaging can be useful in increasing the frame rate of ultrasound imaging in comparison to conventional methods that employ transmit focusing. However, with regard to diverging wave imaging and synthetic aperture, these methods have one primary problem: the entire aperture is not excited for each insonification, leading to a degradation in signal-to-noise ratio (SNR).

For diverging wave imaging, the size of the sub-aperture excited during an insonification is limited by the total number of virtual point source locations used to generate a complete image. Indeed, since the overall size of the sub-aperture is preserved for each insonification, the range of lateral positions available for placement of the virtual point sources is limited. For example, if 21 elements are employed for each sub-aperture, the virtual point source associated with each sub-aperture has to be at least 11 elements away from either edge of the ultrasound array. Increasing the number of elements in the sub-array further restricts the placement of the virtual point sources, thereby creating an inherent trade-off between the pressure emitted into the field and the number of compounded images that can be captured. Synthetic aperture imaging has an even more severe pressure loss since only a single element is active during any given insonification.

In the case of synthetic aperture imaging, one approach to addressing this problem is employing spatially encoded emissions to activate the full aperture. Codes for encoding a series of transmissions across the full aperture are derived from an N×N Hadamard matrix, H, where N is set to be equivalent to the number of elements in the ultrasound array. Each insonification is performed with a successive row of the Hadamard matrix. The coding scheme can be represented as follows, where T represents the transmit pulse matrix containing the appropriate group delay, P represents the field transfer function, and R is the received data at the array:

$$HT\Phi=R.$$

Once N insonifications (one for each row of the Hadamard matrix) are performed and respective receive data is captured, the received data can be decoded to obtain decoded received data that is equivalent to the received data that would be obtained if each element was individually excited (i.e. as in conventional synthetic aperture imaging), albeit with 'N' times more signal strength per transmit pulse that conventional synthetic aperture beamforming. Specifically, decoding of the received data can be performed by using the transpose of the Hadamard matrix as follows:

$$IT\Phi=H^{T}R.$$

The decoding process produces the identity matrix I that diagonalizes the transmit matrix when the product is executed with the transmit matrix T. The result is a mathematical equivalent to a synthetic aperture matrix, where the receive data is now formatted as though only one element was active for each insonification.

The advantage of the Hadamard-encoded method described above over conventional synthetic aperture imaging is that a VI improvement in SNR is obtained due to the use of the full aperture for transmission. However, the Hadamard-encoded method nonetheless has limited applicability for high speed imaging applications due to the need to perform N insonifications per image. For example, even for smaller arrays of 64 elements, N insonifications can push the effective frame rate below the shear-wave imaging threshold of 1000 fps, which limits its overall clinical effectiveness. Therefore, it is apparent that Hadamard-encoded plane wave imaging still suffers from the inability to achieve imaging with a sufficiently high frame rate for some clinical applications.

The present inventors therefore set out to address this technical problem and to develop an improved method of ultrasound imaging that would realize the benefits of encoded transmission while also being capable of achieving higher frame rates.

The present inventors realized that a compromise could be achieved by transmitting encoded waves using a subset of the total number of rows of an invertible orthogonal matrix—such as a Hadamard matrix—in other words, employing a sparse set of orthogonal codes for encoding transmission and decoding receive signals.

In the example case of a Hadamard matrix, a complete set of orthogonal basis codes is defined by N Hadamard codes. A complete Hadamard set is represented by $$H = \begin{bmatrix} +1 & +1 & +1 & +1 & +1 & +1 & +1 & +1 \\ +1 & -1 & +1 & -1 & +1 & -1 & +1 & -1 \\ +1 & +1 & -1 & -1 & +1 & +1 & -1 & -1 \\ +1 & -1 & -1 & +1 & +1 & -1 & -1 & +1 \\ +1 & +1 & +1 & +1 & -1 & -1 & -1 & -1 \\ +1 & -1 & +1 & -1 & -1 & +1 & -1 & +1 \\ +1 & +1 & -1 & -1 & -1 & -1 & +1 & +1 \\ +1 & -1 & -1 & +1 & -1 & +1 & +1 & -1 \end{bmatrix}.$$

The number of codes can be reduced by sparsely selecting rows from the Hadamard encode matrix. The selection of a sparse (subset) of rows of the Hadamard matrix can be represented as sparse matrix with zero padded rows. For example, in one non-limiting example implementation, the selection of a subset of M rows of the N-row Hadamard matrix, where N=8 and M=4, can be represented as follows:

$$H_S = \begin{bmatrix} +1 & +1 & +1 & +1 & +1 & +1 & +1 & +1 \\ 0 & 0 & 0 & 0 & 0 & 0 & 0 & 0 \\ +1 & +1 & -1 & -1 & +1 & +1 & -1 & -1 \\ 0 & 0 & 0 & 0 & 0 & 0 & 0 & 0 \\ +1 & +1 & +1 & +1 & -1 & -1 & -1 & -1 \\ 0 & 0 & 0 & 0 & 0 & 0 & 0 & 0 \\ +1 & +1 & -1 & -1 & -1 & -1 & +1 & +1 \\ 0 & 0 & 0 & 0 & 0 & 0 & 0 & 0 \end{bmatrix}.$$

Examining the sparse Hadamard matrix shown above, it can be seen that the selected subset of codes corresponds to the rows of the Hadamard matrix that have the lowest spatial frequencies. Such an approach to row selection effectively groups elements into powers of 2, where each element in a group is provided the same code (e.g. a binary code of +/−1). The number of insonifications required for decoding can thus be reduced to any power of 2 by controlling the minimum group size in the set of Hadamard codes. For example, in the case of an 8-element array, as an example— an image can be captured by using a sparse matrix using two or four insonifications by the selection of two or four rows of the Hadamard matrix, respectively.

It is noted that encoding transmit insonifications with rows filled with zeros is analogous to not transmitting signals for these rows. Therefore, sparsely populating the Hadamard matrix is equivalent to reducing the number of transmit insonifications.

In the case of the sparse Hadamard matrix shown above, with only rows 1, 3, 5 and 7 being employed for encoded transmission, the receive signals can be represented with the following zero-padded receive signal matrix:

$$R_S = \begin{bmatrix} R_{11} & R_{12} & \cdots & R_{17} & R_{18} \\ 0 & 0 & & 0 & 0 \\ \vdots & & \ddots & & \vdots \\ R_{71} & R_{72} & & R_{77} & R_{78} \\ 0 & 0 & \cdots & 0 & 0 \end{bmatrix},$$

where the receive data for the 8 elements is captured for the odd rows of the sparse Hadamard matrix. Decoding is performed using the transpose of the sparse Hadamard matrix $H_S^T$. The implication of this method is that the standard identity matrix, which is typically produced by taking the product of the Hadamard matrix with its transpose, is approximated as follows:

$$H_S^T H_S = \begin{bmatrix} 4 & 4 & 0 & 0 & 0 & 0 & 0 & 0 \\ 4 & 4 & 0 & 0 & 0 & 0 & 0 & 0 \\ 0 & 0 & 4 & 4 & 0 & 0 & 0 & 0 \\ 0 & 0 & 4 & 4 & 0 & 0 & 0 & 0 \\ 0 & 0 & 0 & 0 & 4 & 4 & 0 & 0 \\ 0 & 0 & 0 & 0 & 4 & 4 & 0 & 0 \\ 0 & 0 & 0 & 0 & 0 & 0 & 4 & 4 \\ 0 & 0 & 0 & 0 & 0 & 0 & 4 & 4 \end{bmatrix}.$$

It is noted that the sparse form of the Hadamard matrix need not be employed when generating the transposed matrix that is used to decode the receive signal matrix shown above. For example, when the receive signal matrix is zero padded for non-transmit events as shown above for $R_S$, then $H_S^T R_S$ and $H^T R_S$ will give equivalent results. However, if the receive signal matrix is not zero padded, and instead noisy receive data is collected during non-transmit events, then it may be beneficial to employ the sparse form of the Hadamard matrix to generate the transposed matrix.

In an alternative example implementation, the receive signal matrix and the Hadamard matrix may be represented as smaller dense matrices that are absent of zero padded rows (instead of larger sparse matrices). For example, in the example case shown above, in which a subset of four rows of an 8×8 Hadamard matrix were employed for encoding, the sparse Hadamard matrix can alternatively be represented as:

$$H_{S'} = \begin{bmatrix} +1 & +1 & +1 & +1 & +1 & +1 & +1 & +1 \\ +1 & +1 & -1 & -1 & +1 & +1 & -1 & -1 \\ +1 & +1 & +1 & +1 & -1 & -1 & -1 & -1 \\ +1 & +1 & -1 & -1 & -1 & -1 & +1 & +1 \end{bmatrix},$$

and the received signal matrix can be represented as:

$$R_{S'} = \begin{bmatrix} R_{11} & R_{12} & \cdots & R_{17} & R_{18} \\ R_{31} & R_{32} & \cdots & R_{37} & R_{38} \\ R_{51} & R_{52} & \cdots & R_{57} & R_{58} \\ R_{71} & R_{72} & \cdots & R_{77} & R_{78} \end{bmatrix}.$$

Taking the product of $H_{S'}$ and $H_{S'}^T$, yields the same result as $H_S^T H_S$, $$H_{S'}^T H_{S'} = \begin{bmatrix} 4 & 4 & 0 & 0 & 0 & 0 & 0 & 0 \\ 4 & 4 & 0 & 0 & 0 & 0 & 0 & 0 \\ 0 & 0 & 4 & 4 & 0 & 0 & 0 & 0 \\ 0 & 0 & 4 & 4 & 0 & 0 & 0 & 0 \\ 0 & 0 & 0 & 0 & 4 & 4 & 0 & 0 \\ 0 & 0 & 0 & 0 & 4 & 4 & 0 & 0 \\ 0 & 0 & 0 & 0 & 0 & 0 & 4 & 4 \\ 0 & 0 & 0 & 0 & 0 & 0 & 4 & 4 \end{bmatrix}.$$

and therefore calculating $H_{S'}^T R_{S'}$ is equivalent to calculating $H_S^T R_S$.

It is noted that the columns of the sparse Hadamard matrix can be reordered so that the decoding process provides a receive data set corresponding to having non-adjacent elements having been activated at the same time. For example, the following example matrix is based on the selection of four rows of an 8×8 Hadamard matrix, with the columns re-ordered such that the codes are identical, during each transmit event, for elements 1 and 5, 2 and 6, 3 and 7, and 4 and 8:

$$H_{sc} = \begin{bmatrix} +1 & +1 & +1 & +1 & +1 & +1 & +1 & +1 \\ +1 & -1 & +1 & -1 & +1 & -1 & +1 & -1 \\ +1 & +1 & -1 & -1 & +1 & +1 & -1 & -1 \\ +1 & -1 & -1 & +1 & +1 & -1 & -1 & +1 \end{bmatrix}.$$

The decoding process for this matrix yields:

$$H_{SC}^T H_{SC} = \begin{bmatrix} 4 & 0 & 0 & 0 & 4 & 0 & 0 & 0 \\ 0 & 4 & 0 & 0 & 0 & 4 & 0 & 0 \\ 0 & 0 & 4 & 0 & 0 & 0 & 4 & 0 \\ 0 & 0 & 0 & 4 & 0 & 0 & 0 & 4 \\ 4 & 0 & 0 & 0 & 4 & 0 & 0 & 0 \\ 0 & 4 & 0 & 0 & 0 & 4 & 0 & 0 \\ 0 & 0 & 4 & 0 & 0 & 0 & 4 & 0 \\ 0 & 0 & 0 & 4 & 0 & 0 & 0 & 4 \end{bmatrix}.$$

The receive data under this configuration will now be representative of having elements 1 and 5, active for the first data set, 2 and 6 active for the next data set, and so on. This provides flexibility in controlling which elements are effectively activated together on the decoded datasets.

While the preceding method of sparse Hadamard encoding is successful increasing the frame rate, it nonetheless can suffer from problems associated with directivity. These problems can be understood as follows. When performing transmit pulsing using synthetic-aperture-based techniques, it is important to insonify the entire field of view without an unduly narrow directivity profile. This is especially important for phased array imaging where large steering angles are inherent. For conventional synthetic aperture beamforming, in which one element is pulsed at a time, the wavefront will approximate that of a point emitter and the range of insonification angles will be very large. This is also true with a Hadamard decoding scheme when N transmit pulses are used. However, if a sparse set of Hadamard codes are used to encode plane waves, the directivity or range of insonification angles deteriorates due to an increase in the effective element size, as explained further in Example 2 below.

The present inventors realized that this problem of loss of directivity when employing sparse encoding can be mitigated by encoding diverging waves, as opposed to plane waves, with a sparse set of codes of an invertible orthogonal matrix. By combining sparse orthogonal encoding with diverging wave transmission, in effect "surfing" a sparse set of orthogonal codes onto a set of diverging waves, the present inventors were able to provide a solution that facilitates increased frame rates (e.g. frame rates in excess of 1000 fps for ultrafast ultrasound imaging applications) while also providing a broad angular insonification profile with improved directivity and employing a large or full aperture for improved signal-to-noise ratio.

Figure 4:
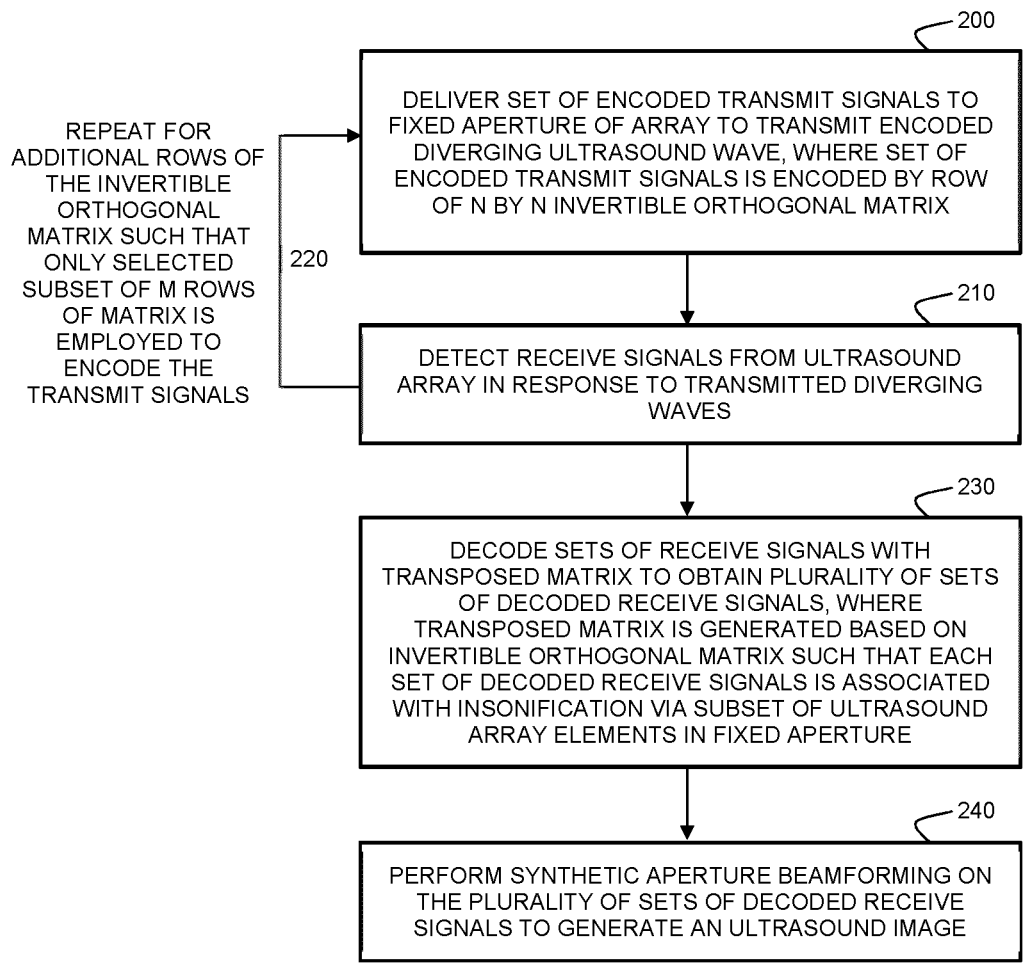
FIG. 4 is a flow chart illustrating a method of performing ultrasound imaging using decoding via an invertible sparse orthogonal matrix.

Referring now to FIG. 4, a flow chart is provided that describes an example method of performing sparsely encoded diverging wave imaging. At step 200, a set of encoded transmit signals are delivered to a fixed aperture of an ultrasound array for transmitting an encoded diverging wave. The set of encoded transmit signals, respectively delivered to the array elements of the fixed aperture, are encoded by codes corresponding to a row of an invertible orthogonal matrix. Ultrasound receive signals are then detected by the array elements of the fixed aperture at 210. This process is repeated, as shown at 220, in order to transmit additional encoded diverging waves, such that a series of encoded diverging waves are transmitted and received, and such that only a selected subset of M rows of the invertible orthogonal matrix is employed to encode the diverging waves. As noted above, the M rows may be the rows having the lowest spatial frequencies, but the rows need not be selected on this basis. In step 230, the sets of receive signals that correspond to the plurality of transmitted encoded diverging waves are decoded using a transposed matrix. The transposed matrix is generated based on the invertible orthogonal matrix, such that each set of decoded receive signals is associated with insonification via a subset of ultrasound elements of the fixed aperture. According to various non-limiting examples, as explained above, the transposed matrix may be the transpose of the complete invertible orthogonal matrix (e.g. when a sparse matrix of receive signals is employed during decoding), or the transposed matrix may be a transpose of a sparse invertible orthogonal matrix that is zero padded for the unselected rows that are not employed for encoding diverging waves, or the transposed matrix may a transpose of a dense version of the invertible orthogonal matrix that is absent of the unselected rows that are not employed for encoding diverging waves (where a dense matrix of receive signals is employed during decoding). Synthetic aperture beamforming is then performed on the plurality of sets of decoded receive signals to generate an ultrasound image, as shown at step 240. Synthetic aperture beamforming entails inserting time-of-flight delays from each transmit elements corresponding to a plurality of sets of decoded receive signals to any focus in the field of view, and back to each of the receive elements. An image will be generated for each of the transmit elements which are then compounded together to form a two-way focused image.

As noted above, the decoded sets of receive signals (e.g. the decoded receive signal matrix) is representative of insonifying the medium with groups of elements that are effectively activated together and receiving individual channel data for each of these respective insonifications. For convenience, one may consider the case where adjacent elements are effectively activated together.

Figure 5A:
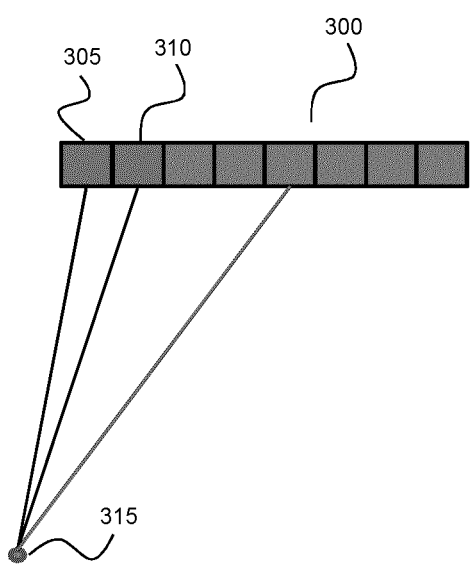
FIGS. 5A and 5B illustrate different methods of determining time of flight values when performing synthetic aperture beamforming of decoded receive signals.

In one example embodiment, synthetic-aperture beamforming is applied to the receive data on a per-element basis, as shown in FIG. 5A, which shows an array aperture 300 that is employed for sparse encoded diverging wave imaging. In the present example that is illustrated in FIG. 5A, the elements 305 and 310 are the subset or group of elements that effectively insonify the medium after performing decoding. According to the present example method, the time-of-flight (TOF) delays are separately computed for each of the elements in the group. For example, the time of flight is first taken as originating from element 305 to a point 315 in space and back to another element on the array, even though two elements were transmitted together. This process is then repeated for element 310. This effectively repeatedly uses the decoded set of receive signals to perform time-of-flight calculations on a per-element basis. The aforementioned per-element synthetic aperture beamforming method that is illustrated in FIG. 5A approximates conventional synthetic-aperture for both transmit and receive from N elements, where 'noise' from adjacent elements transmitted is ignored. It is noted that this method tolerates the added 'noise' from having effectively pulsed all the elements in the group at once to prevent grating lobes from manifesting into the images. This compromise becomes more severe as the group size increases. Therefore, there is an inherent trade-off in image quality as the number of codes are reduced.

Figure 5B:
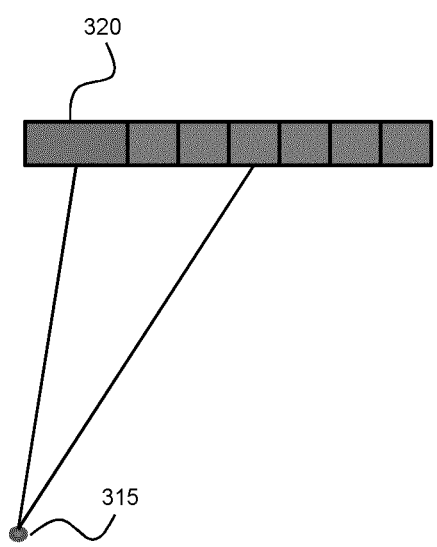

FIG. 5B illustrates an alternative method of synthetic aperture beamforming, where the time of flight delays used to generate a transmit focus employ the delays from the grouped transmit element 320 to the point in space 315 and back to the other elements on the array. The element pitch of the transmit aperture in this case is now twice that of the original aperture.

In phased array applications the element pitch is typically maintained to be $\lambda/2$ or lower so that grating lobe artifacts do not manifest in the image. If the technique illustrated in FIG. 5A is employed, the pitch of the effective transmit aperture is held constant and grating lobe artifacts can be avoided, while the method shown in FIG. 5B produces a B times increase of the element pitch, where B is the number of elements binned together, resulting in grating lobe artifacts.

While many of the examples provided in the present disclosure employ sparse Hadamard matrices (a subset of rows of a full Hadamard matrix) for encoding a set of diverging waves, it will be understood that other types of invertible orthogonal matrices may be alternatively employed for sparse encoding. One example of an alternative invertible orthogonal matrix is an S-sequence matrix, which can be formed based on a Hadamard matrix. The order of an S-sequence matrix that is generated based on a Hadamard matrix is $M=2^N-1$, where $2^N$ is the order of a Hadamard matrix. An S-sequence matrix can be obtained by replacing any 1 in the Hadamard matrix by a 0, any −1 with a 1, and removing the first row and column of the matrix. Such a matrix has the same invertible properties as the Hadamard matrix and could therefore be employed for sparse encoding of diverging waves. However, this approach may be less advantageous that Hadamard encoding, since the zeros in the S-sequence matrix would lower the emitted energy in the ultrasound field, reducing the SNR.

As described above, one motivation for the development of present sparely encoded diverging wave method was to provide a solution that facilitates use of a large transmit aperture relative to conventional diverging wave and synthetic aperture imaging approaches. Indeed, conventional diverging wave imaging employs sub-apertures for each insonification, with adjustment of the position of the aperture for each successive insonification. Moreover, when performing conventional diverging wave imaging, the sub-aperture size is held constant across all insonifications therefore the size of the aperture shrinks when more virtual point sources are used since the sub-aperture size limits the range of point source positions that can be used. This limits the total signal and pressure that is transmitted into the medium. In contrast, the systems and methods disclosed herein do not apply constraints to the aperture size. In some example embodiments, sparsely encoded orthogonal diverging wave imaging may be performed using the full aperture of the ultrasound array, or alternatively a fixed sub-aperture of the ultrasound array.

The present inventors have found that it is preferable for the diverging waves that are encoded with the sparse orthogonal codes to be equal among the multiple transmit events. Alternatively, minor variations in the geometry of the diverging waves across multiple transmit events could be employed. Variations in the geometry of the diverging waves may introduce mathematical errors in the decoding process. The extent at which these errors may be tolerated would depend on the specific application.

Figure 6:
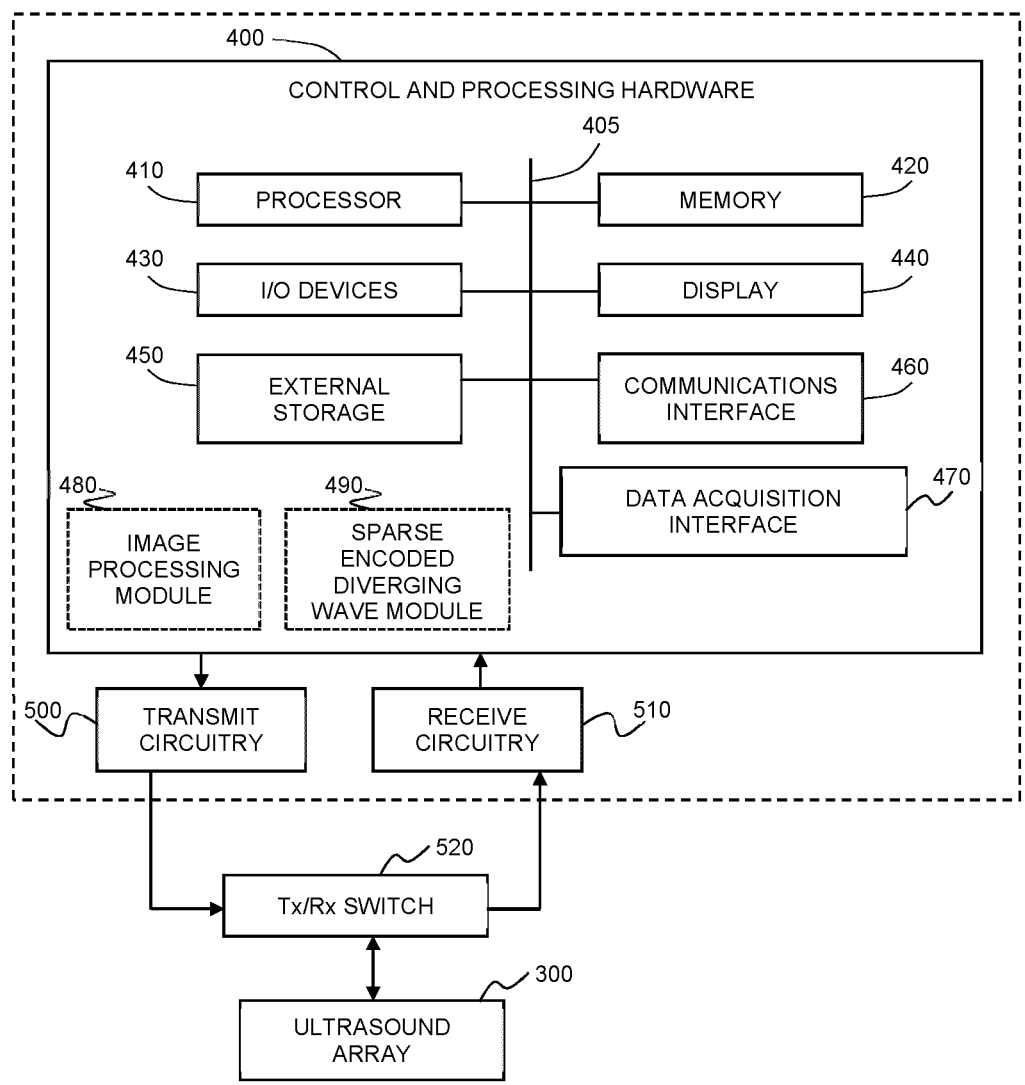
FIG. 6 is an example system for performing sparse orthogonal diverging wave ultrasound imaging.

Referring now to FIG. 6, an example imaging system is illustrated for performing sparse orthogonal diverging wave imaging with an ultrasound array. The example system includes an ultrasound array 300 comprising a set of ultrasound transducer array elements (e.g. piezoelectric elements, which may be a component of an ultrasound imaging device, such as an ultrasound imaging endoscope), transmit circuitry 500 for delivering transmit voltage pulses to the ultrasound array 300, a transmitter-receiver switch 520, receive circuitry 510 for detecting receive signals from the ultrasound array 300, and control and processing hardware 200 (e.g. a controller, computer, or other computing system).

Control and processing hardware 200 is employed to control transmit circuitry 300 and Tx/Rx switch 520, and for processing the receive signals obtained from receive circuitry 510. As shown in FIG. 6, in one embodiment, control and processing hardware 300 may include a processor 410, a memory 420, a system bus 405, one or more input/output devices 430, and a plurality of optional additional devices such as communications interface 460, display 440, external storage 450, and data acquisition interface 470.

The present example methods of performing sparse orthogonal diverging wave imaging (e.g. the example method illustrated in FIG. 4) can be implemented via processor 410 and/or memory 420. As shown in FIG. 6, the control of the delivery of encoded transmit signals suitable for generating sparsely encoded diverging waves, the decoding of the receive signals, and subsequent synthetic aperture beamforming, may be implemented by control and processing hardware 400, via executable instructions represented as sparse encoded diverging wave module 490. The control and processing hardware 400 may include and execute scan conversion software (e.g. real-time scan conversion software) or other image processing functionality as represented by image processing module 480.

The functionalities described herein can be partially implemented via hardware logic in processor 410 and partially using the instructions stored in memory 420. Some embodiments may be implemented using processor 410 without additional instructions stored in memory 420. Some embodiments are implemented using the instructions stored in memory 420 for execution by one or more general purpose microprocessors. In some example embodiments, customized processors, such as application specific integrated circuits (ASIC) or field programmable gate array (FPGA), may be employed. Thus, the disclosure is not limited to a specific configuration of hardware and/or software.

Referring again to FIG. 6, it is to be understood that the example system shown in the figure is not intended to be limited to the components that may be employed in a given implementation. For example, the system may include one or more additional processors. Furthermore, one or more components of control and processing hardware 400 may be provided as an external component that is interfaced to a processing device. For example, as shown in the figure, any one or more of transmit circuitry 500, receive circuitry 510, and Tx/Rx switch 520 may be included as a component of control and processing hardware 400 (as shown within the dashed line), or may be provided as one or more external devices.

While some embodiments can be implemented in fully functioning computers and computer systems, various embodiments are capable of being distributed as a computing product in a variety of forms and are capable of being applied regardless of the particular type of machine or computer readable media used to actually effect the distribution.

At least some aspects disclosed herein can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

A computer readable storage medium can be used to store software and data which when executed by a data processing system causes the system to perform various methods. The executable software and data may be stored in various places including for example ROM, volatile RAM, nonvolatile memory and/or cache. Portions of this software and/or data may be stored in any one of these storage devices. As used herein, the phrases "computer readable material" and "computer readable storage medium" refers to all computer-readable media, except for a transitory propagating signal per se.

EXAMPLES

The following examples are presented to enable those skilled in the art to understand and to practice embodiments of the present disclosure. They should not be considered as a limitation on the scope of the disclosure, but merely as being illustrative and representative thereof.

The examples below present results from simulations of a 64 element 40 MHz phased array with a λ/2 element pitch, based on the method shown in FIG. 4 using sparse Hadamard array encoding of diverging waves.

Figure 7A:
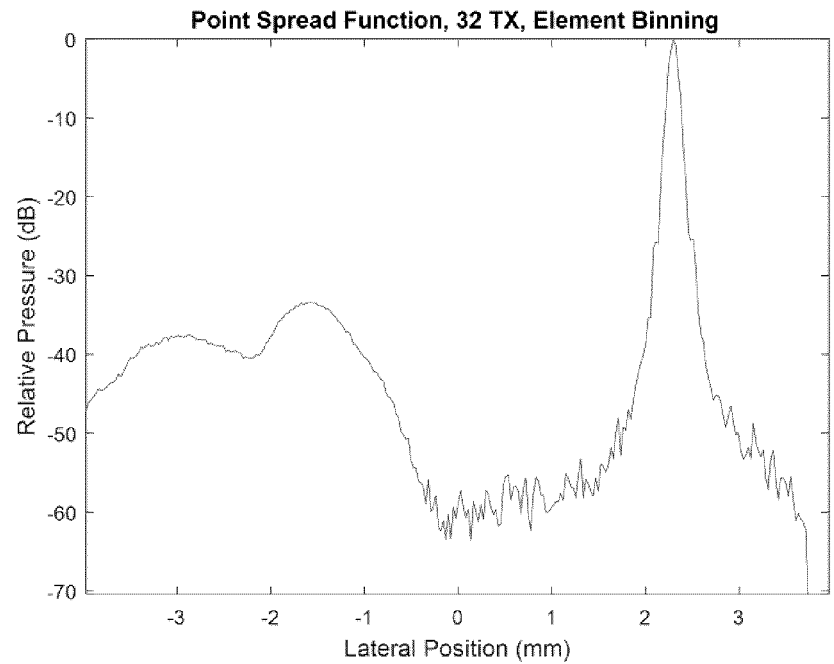
FIG. 7A plots the lateral point spread function based on simulations involving 32 Hadamard codes with element binning for a 64 element 40 MHz phased array with a $\lambda/2$ element pitch.
Figure 7B:
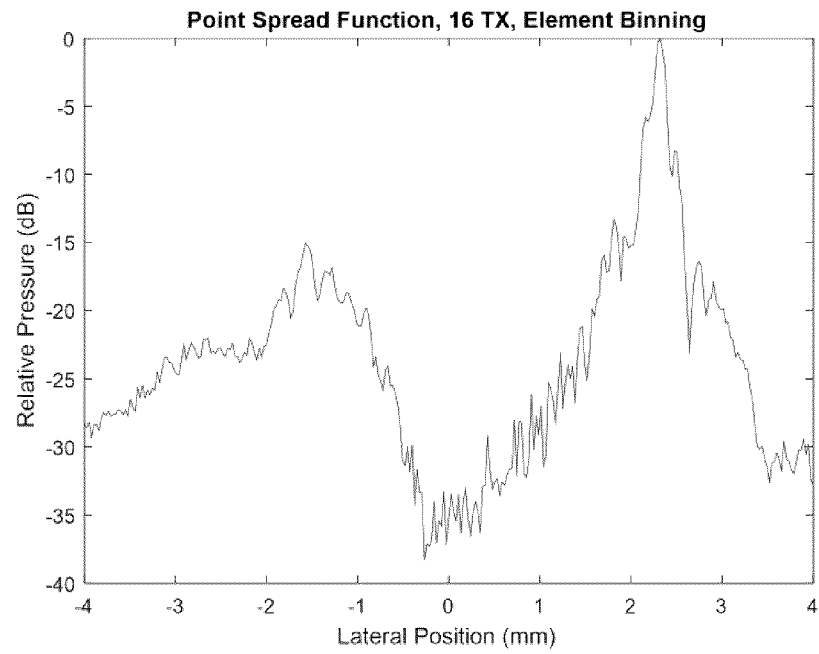
FIG. 7B plots the lateral point spread function based on simulations involving 16 Hadamard codes with element binning for a 64 element 40 MHz phased array with a $\lambda/2$ element pitch.

Example 1: Improved Point Spread Function Obtained Using Per-Element Time-of-Flight Calculations During Synthetic Aperture Beamforming FIGS. 7A-7B show simulated point spread functions with a wire target placed at a 4 mm radius and positioned at 35 degrees relative to the center of the aperture. FIG. 7A shows results obtained using the 32 rows of the 64 by 64 Hadamard matrix, where the 32 rows were selected as the rows having the lowest spatial frequencies. When performing synthetic aperture beamforming of the decoded receive signals, elements were binned in pairs, as shown in FIG. 5B. FIG. 7B shows results obtained using the 16 rows of the 64 by 64 Hadamard matrix having the lowest spatial frequencies, with elements binned in groups of 4 during synthetic aperture beamforming after decoding. The figures illustrate the signal degradation resulting from grating lobe artifacts that are generated when the effective transmit aperture pitch is increased by binning elements in groups during the calculation of times of flight while performing synthetic aperture beamforming.

Figure 8A:
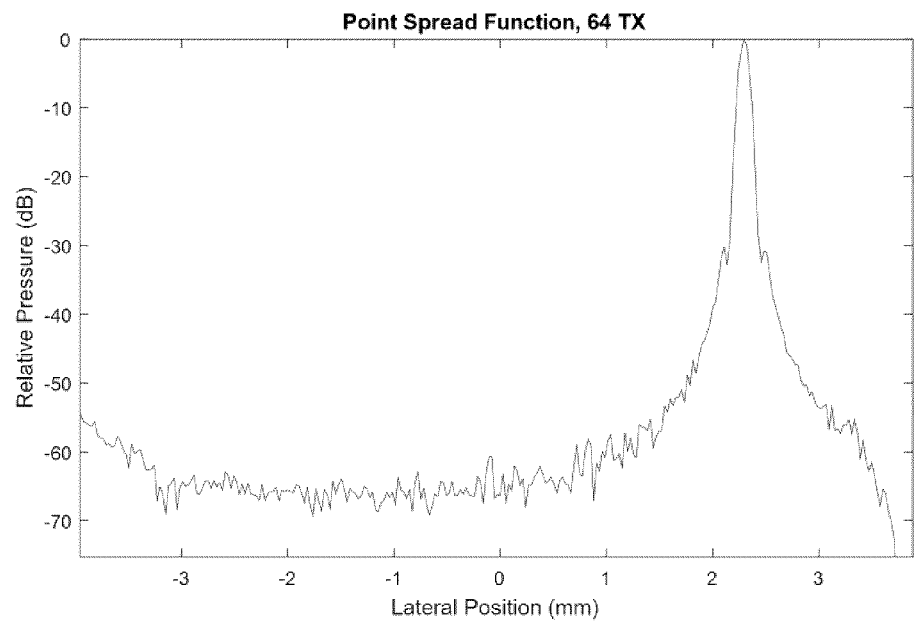
FIG. 8A plots the lateral point spread function based on simulations involving 64 Hadamard codes for a 64 element 40 MHz phased array with a $\lambda/2$ element pitch.
Figure 8B:
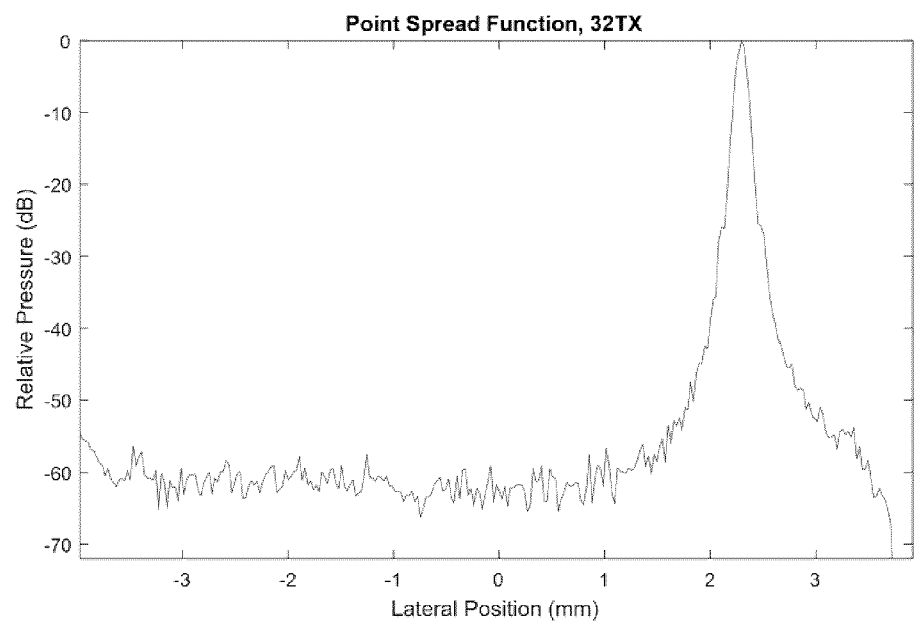
FIG. 8B plots the lateral point spread function based on simulations involving 32 Hadamard codes without element binning for a 64 element 40 MHz phased array with a $\lambda/2$ element pitch.
Figure 8C:
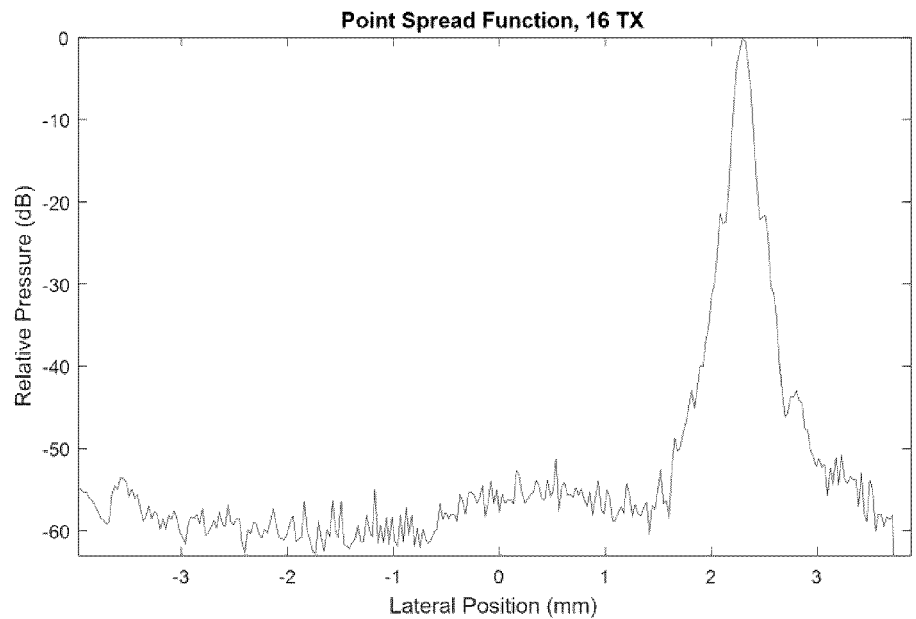
FIG. 8C plots the lateral point spread function based on simulations involving 16 Hadamard codes without element binning for a 64 element 40 MHz phased array with a $\lambda/2$ element pitch.
Figure 8D:
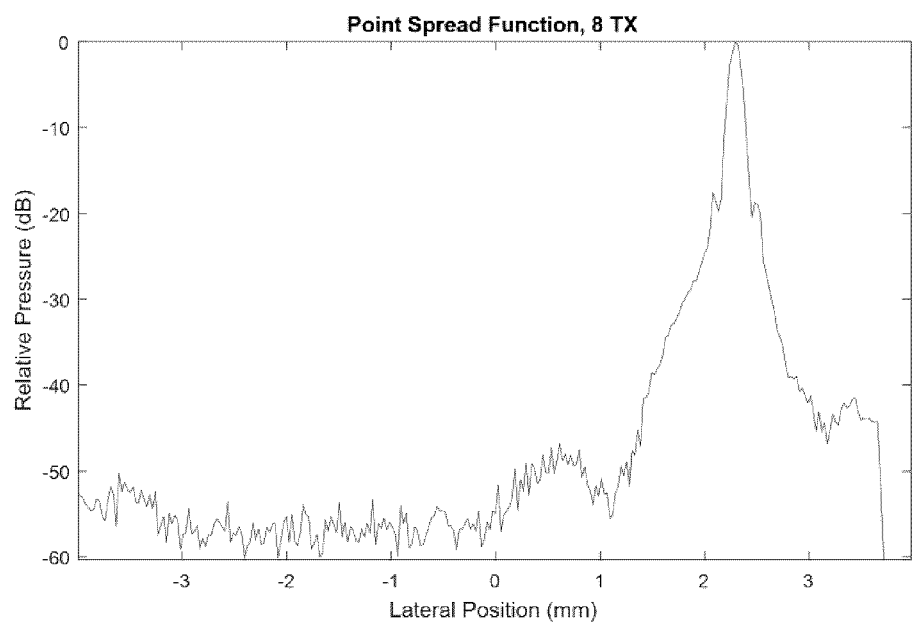
FIG. 8D plots the lateral point spread function based on simulations involving 8 Hadamard codes without element binning for a 64 element 40 MHz phased array with a $\lambda/2$ element pitch.
Figure 8E:
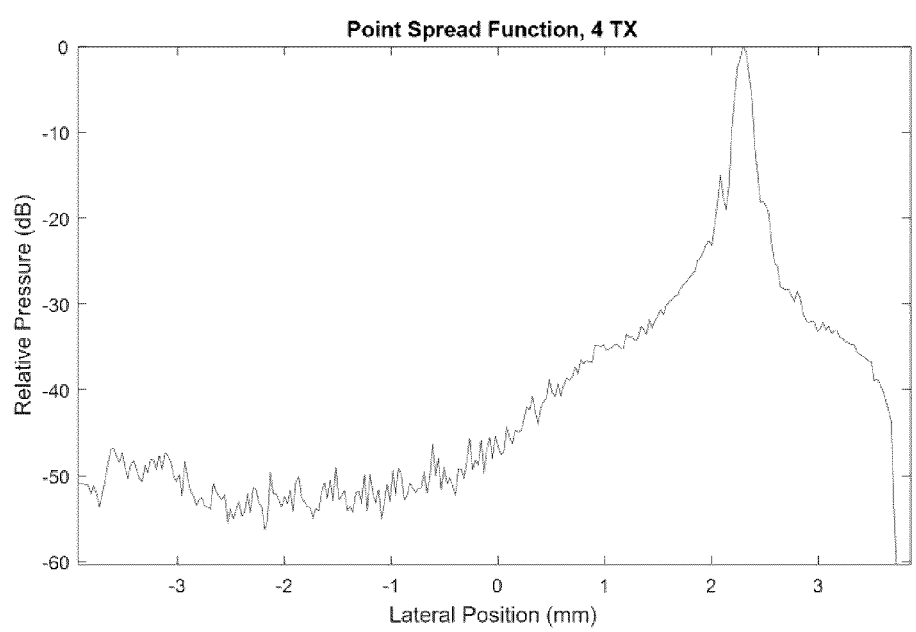
FIG. 8E plots the lateral point spread function based on simulations involving 4 Hadamard codes without element binning for a 64 element 40 MHz phased array with a $\lambda/2$ element pitch.

FIGS. 8B-8E show improved simulated point spread functions that are obtained when the times-of-flight are calculated during synthetic aperture beamforming without binning elements, as shown in FIG. 5A, using 32, 16, 8 and 4 rows of the Hadamard matrix, respectively. FIG. 8A shows results obtained using the full 64 rows of the 64 by 64 Hadamard matrix as a reference. The figures illustrate the absence of grating lobe artifacts and the significantly improved point spread functions that are achieved by calculating time-of-flight values on a per-element basis instead of an element-group basis. Using the per-element approach illustrated in FIG. 5A, the transmit aperture pitch can be preserved when reducing the number of insonifications by sparsely selecting rows of the Hadamard matrix.

Figure 9A:
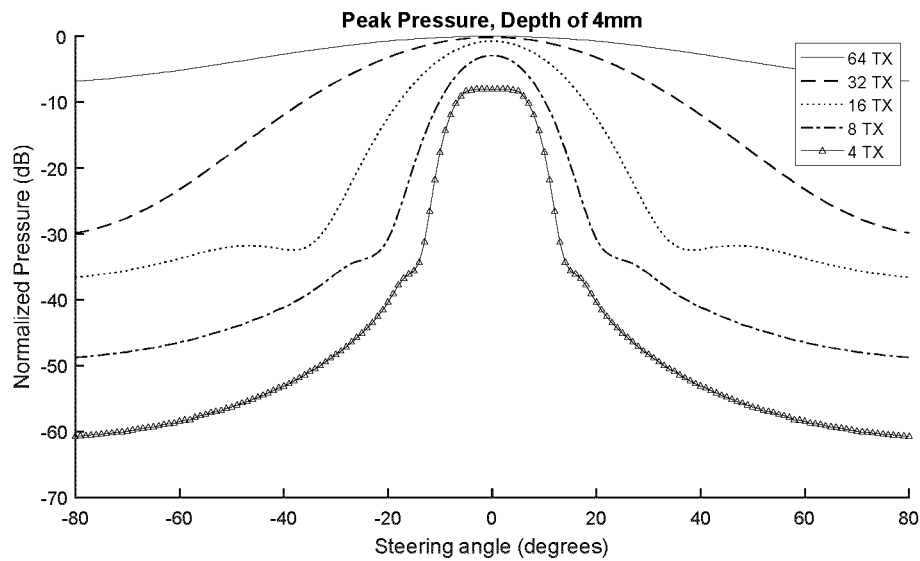
FIGS. 9A and 9B plot directivity measurements for Hadamard encoded insonifications. The peak pressure is referenced to the peak simulated pressure for the 64 TX case. The data is provided in dB (FIG. 9A) and on a linear scale (FIG. 9B).
Figure 9B:
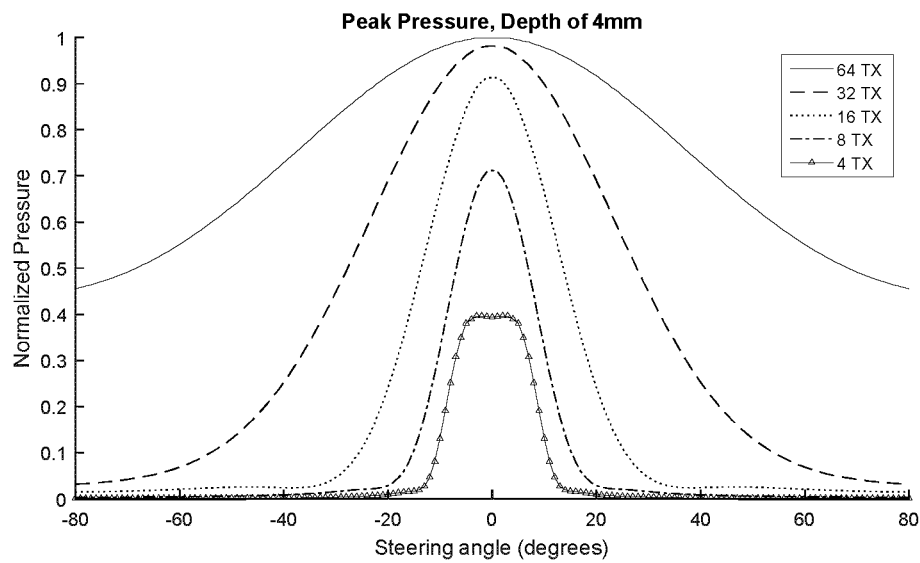

Example 2: Improved Directivity Obtained by Encoding Sparse Hadamard Codes on Diverging Wave As explained above, when a sparse set of Hadamard codes are used to encode a set of plane waves, the directivity or range of insonification angles deteriorates due to an increase in the effective element size. This effect is illustrated in FIGS. 9A and 9B, where peak pressure is plotted as a function of steering angle for Hadamard encoded plane wave imaging using 64 codes, and also using 32, 16, 8 and 4 sparse codes. The full-width half-maximum (FWHM) of the directivity functions based on encoded plane waves are $136^\Theta$, $160^\Theta$, and $140^\Theta$, when encoding waves with 64, 32, and 16 Hadamard codes, respectively. As can be seen in the figure, the directivity becomes increasingly narrow as the number of sparse codes is reduced.

Figure 10A:
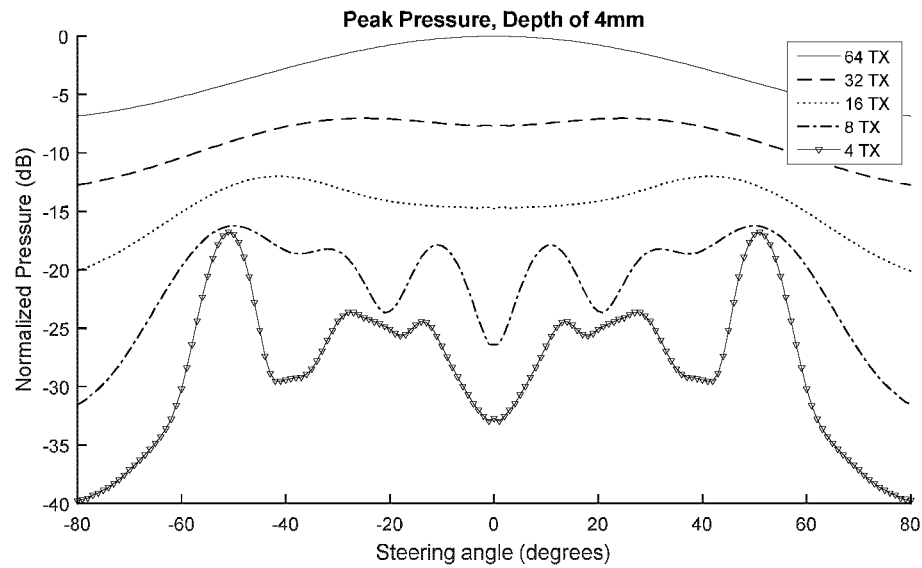
FIGS. 10A and 10B plot directivity measurements for Hadamard encoded insonifications surfed onto a diverging wave. The peak pressure is referenced to the peak simulated pressure for the 64 TX case. The data is provided in dB (FIG. 10A), and on a linear scale (FIG. 10B).
Figure 10B:
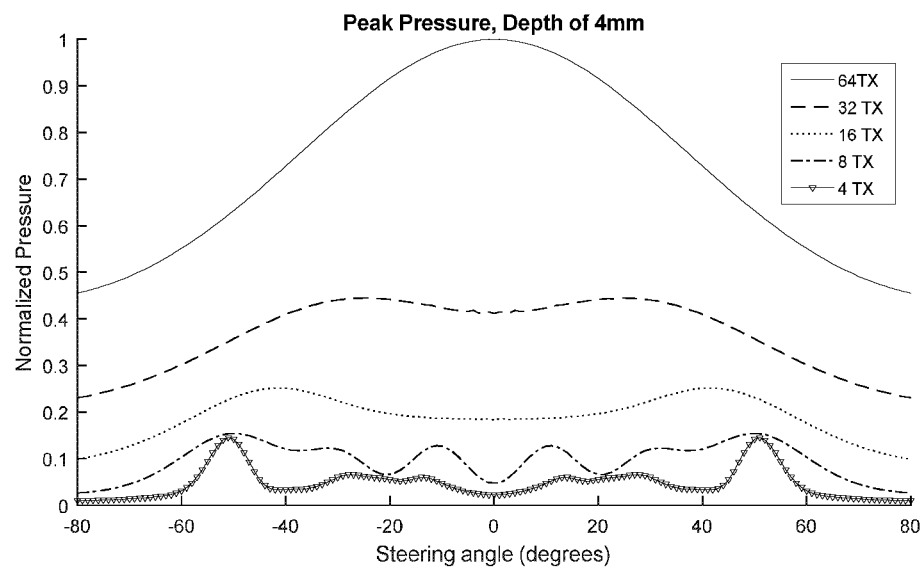

This drawback is mitigated by encoding diverging waves instead of plane waves, as shown in FIGS. 10A and 10B. The full-width half-maximum (FWHM) of the directivity functions based on encoded diverging waves are $136^\Theta$, $160^\Theta$, and $140^\Theta$, when encoding waves with 64, 32, and 16 Hadamard codes, respectively, which is much broader than the corresponding values obtained with plane waves. When using fewer Hadamard codes, i.e. 8 and 4, the directivity function becomes a complex polynomial when a diverging wave is employed and therefore does not lend itself well to the FWHM comparison. Despite this limitation, the graphs distinctly show that the directed energy spans $120^\Theta$ for 8 and 4 Hadamard codes applied to a diverging source, whereas the directivity without encoding a diverging wave drops by over 20 dB before reaching 406 in both cases

Figure 11:
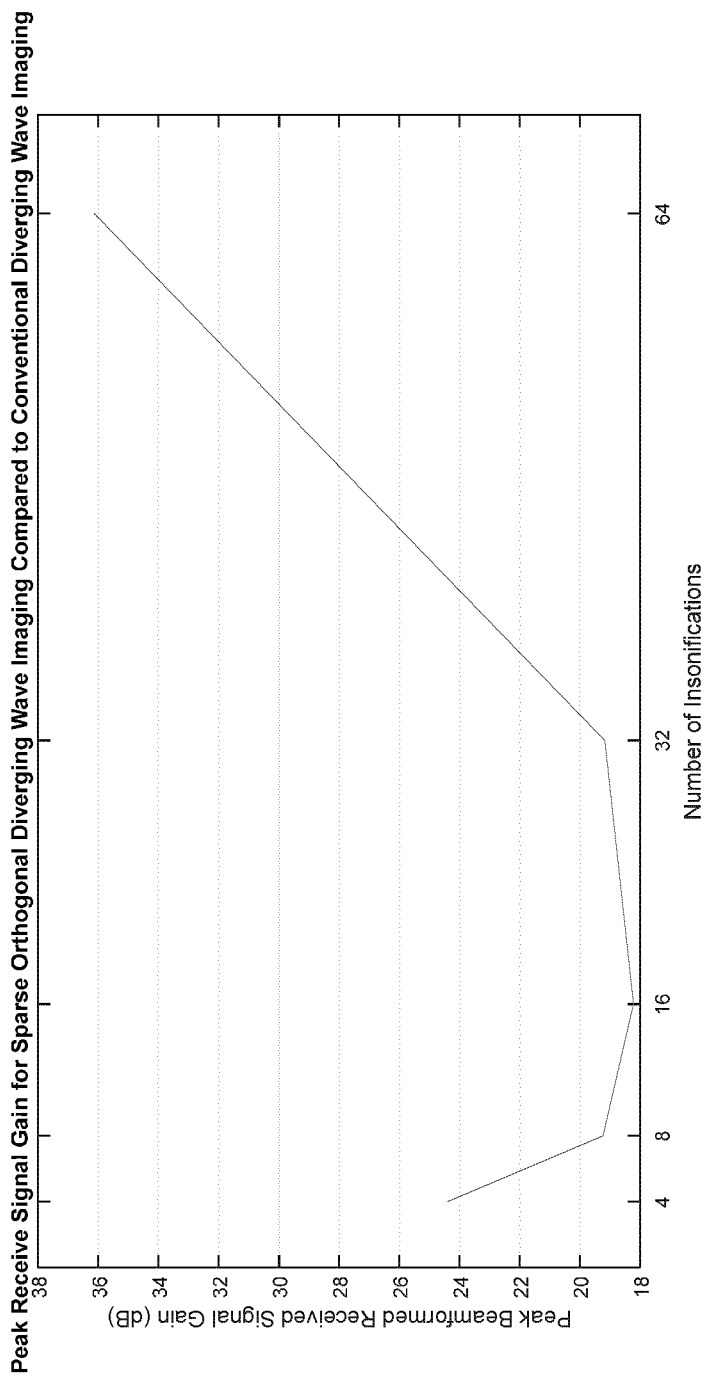
FIG. 11 plots the received signal gain achieved when using sparse orthogonal diverging wave imaging compared to conventional diverging wave imaging, where results are plotted for 4, 8, 16, 32, and 64 insonifications for a 64 element array.

Example 3: Improved Peak Pressure by Encoding Sparse Hadamard Codes on Diverging Wave Simulations were also conducted to compare the peak received signal for sparse orthogonal diverging wave imaging to conventional diverging wave imaging. The size of the sub-aperture employed in the simulations was maximized based on the total number of insonifications used to create a compounded image. FIG. 11 demonstrates the signal gain obtained by the present sparse orthogonal diverging wave imaging method when compared to conventional diverging wave imaging. It is noted that for 64 insonifications, diverging wave imaging on a 64-element array is analogous to synthetic-aperture imaging, therefore 64 times more signal is effectively received in this case. In all cases, the peak receive signal is significantly larger than conventional diverging wave imaging. It is also noted that the signal gain measurements for 4 and 8 insonifications is exaggerated due to the aberrations in the directivity plots shown in FIGS. 10A and 10B.

Example 4: Experimental Comparison of Sparse Orthogonal Diverging Wave Imaging to Conventional Diverging Wave Imaging and Focused Imaging In order to experimentally evaluate the SNR performance of the sparse orthogonal diverging wave imaging technique, various example beamforming algorithms were implemented on a custom system capable of acquiring 64 RF channels in parallel. The system was capable of storing 64 insonification acquisitions for each of the 64 channels and employed a pulse repetition interval of 25 µs. When transmitting 64, 32, 16, 8, and 4 waves, the system frame rate was 0.625, 1.25, 2.5, 5, and 10 kHz respectively. Data was transferred to a PC for decoding and receive beamforming offline. To provide a benchmark for comparison, conventional diverging wave imaging was implemented on the system, since it is the most commonly used ultrafast imaging technique for phased arrays. Lastly, a focused transmission scheme with 4 focal zones positioned at 3.8, 4.7, 6.4, and 7.8 mm depths and 128 steering angles was provided as a reference (512 pulses).

A homogenous tissue mimicking phantom built in accordance to the procedure described in Ryan et al. (Ryan, L. K. et al., "Tissue equivalent vessel phantoms for intravascular ultrasound," Ultrasound Med Biol, vol. 23, no. 2, pp. 261-73, 1997) was imaged using the above-mentioned techniques. With the imaging probe fixed in place, 20 frames of the homogeneous phantom were captured using each imaging scheme. The frames were averaged to produce a true signal for each pixel location and the standard deviation across frames was calculated to provide a noise measurement for each pixel. Taking the ratio of these quantities produces SNR measurements for each pixel. The SNR values were then averaged across 128 image lines yielding SNR curves as a function of depth.

Figures 12, 13:
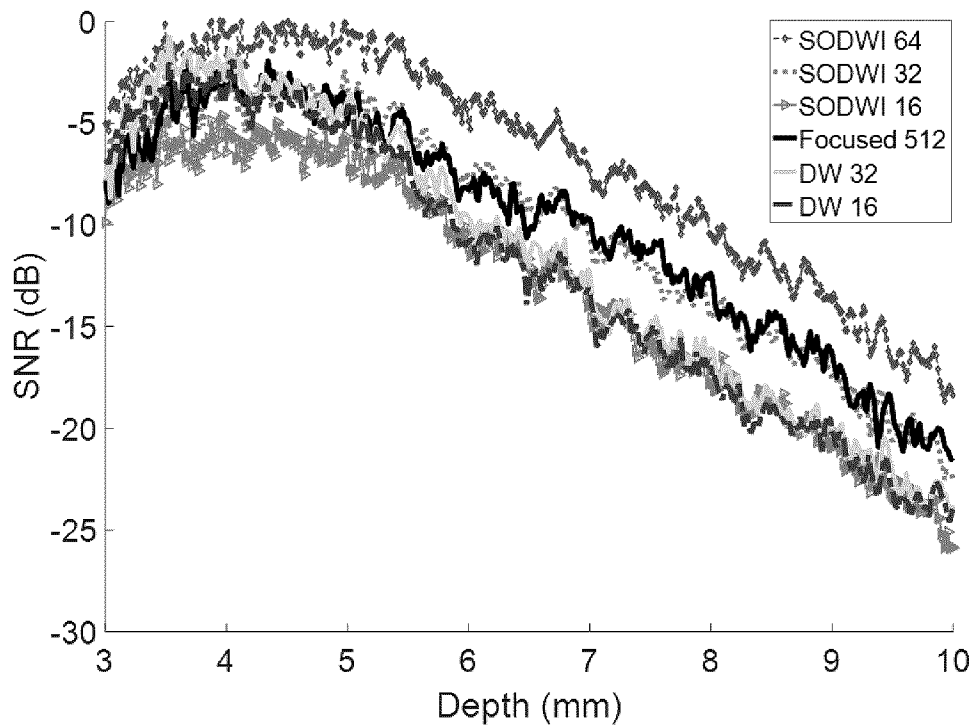
FIG. 12 plots the experimentally measured signal-to-noise ratio (SNR) as a function of imaging depth for sparse orthogonal diverging wave imaging, diverging wave imaging, and conventional focusing, where SODWI=sparse orthogonal diverging wave imaging and DW=diverging wave (imaging).
FIG. 13 is a table comparing the experimental SNR obtained with sparse orthogonal diverging wave imaging to that obtained via focused imaging with 512 pulses.

FIG. 12 illustrates the SNR gain when using additional codes. When 64 codes or insonifications are used, sparse orthogonal diverging wave imaging provided an approximately 3 dB improvement in SNR over focused imaging (with 512 pulses). A configuration using 32 Hadamard codes was found to yield the same SNR as focused imaging and was roughly 2 dB better than the implementation using 32 conventional diverging waves. As the number of codes was further reduced below 16, diverging wave imaging achieved higher SNR than sparse orthogonal diverging wave imaging. The table presented in FIG. 13 shows the mean SNR gain or reduction relative to the focused case for each test configuration. As expected, the SNR drops when reducing the number of insonifications for both distributed wave and sparse orthogonal diverging wave imaging.

Images were captured of an anechoic void embedded inside of a tissue mimicking phantom. FIGS. 14A-14F provide a qualitative comparison of contrast between the various sparse orthogonal diverging wave images and a focused imaging case. The sparse orthogonal diverging wave images respectively displayed 22.1, 19.6, 16.0, 13.8, and 12.2 dB of contrast between the anechoic region and the neighboring tissue, whereas the focused case exhibited 20.3 dB of contrast.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Therefore what is claimed is:

1. An ultrasound imaging system comprising:
an ultrasound array comprising a plurality of ultrasound array elements;
control and processing circuitry operably connected to said plurality of ultrasound array elements, said control and processing circuitry comprising a processor and a memory, wherein said processor is configured to execute instructions stored in said memory for performing the steps of:
controlling the delivery of encoded transmit signals to the ultrasound array to sequentially transmit a plurality of diverging ultrasound waves, wherein each diverging ultrasound wave is generated by transmitting a respective set of encoded transmit signals to a fixed aperture of said ultrasound array, the fixed aperture consisting of N elements of the ultrasound array;
wherein each set of encoded transmit signals is encoded by a respective row of an N×N invertible orthogonal matrix such that only a selected subset of M rows of the invertible orthogonal matrix is employed to encode the transmit signals, wherein M<N;
said processor being further configured to process sets of receive signals received by the ultrasound array, wherein each set of receive signals is associated with transmission of a respective diverging wave, by:
decoding the sets of receive signals with a transposed matrix to obtain a plurality of sets of decoded receive signals, wherein the transposed matrix is generated based on the invertible orthogonal matrix such that each set of decoded receive signals is associated with insonification via a subset of the ultrasound array elements in the fixed aperture; and
performing synthetic aperture beamforming on the plurality of sets of decoded receive signals to generate an ultrasound image.

2. The system according to claim 1 wherein the control and processing circuitry is configured such that each row of the selected subset of M rows of the invertible orthogonal matrix has a lower spatial frequency than the spatial frequencies of the unselected subset of N-M rows of the invertible orthogonal matrix.

3. The system according to claim 1 wherein the control and processing circuitry is configured to perform synthetic aperture beamforming, for a given location, such that at least one given set of decoded receive signals associated with insonification via a given subset of the ultrasound array elements is processed by:
for each ultrasound array element of the given subset of the ultrasound array elements:
determining a set of round-trip times of flight between the ultrasound array element, the location, and the ultrasound array elements of the fixed aperture; and
respectively applying the set of round-trip times of flight to the given set of decoded receive signals;
whereby repeated use of the given set of decoded receive signals for the calculation of times-of-flight on a per-element basis when performing beamforming reduces grating lobe artifacts that would otherwise be associated with grouping array elements during time-of-flight calculations.

4. The system according to claim 1 wherein the control and processing circuitry is configured such that the form of the invertible orthogonal matrix that is transposed is a sparse matrix comprising:
the selected subset of M rows of the invertible orthogonal matrix; and
N-M zero-padded rows.

5. The system according to claim 1 wherein the control and processing circuitry is configured such that the full invertible orthogonal matrix is transposed to generate the transposed matrix, and wherein the transposed matrix is multiplied by a zero-padded sparse receive matrix.

6. The system according to claim 1 wherein the control and processing circuitry is configured such that the form of the invertible orthogonal matrix that is transposed includes only the selected subset of M rows of the invertible orthogonal matrix, and wherein the sets of decoded receive signals are obtained by multiplying the transposed matrix by a receive signal matrix that only includes sets of receive signals that correspond to transmission events.

7. The system according to claim 1 wherein the control and processing circuitry is configured such that each set of decoded receive signals corresponds to an effective transmit event involving adjacent ultrasound array elements.

8. The system according to claim 1 wherein the control and processing circuitry is configured such that each set of decoded receive signals corresponds to an effective transmit event involving non-adjacent ultrasound array elements.

9. The system according to claim 1 wherein the control and processing circuitry is configured such that each set of decoded receive signals corresponds to an effective transmit event involving two ultrasound elements.

10. The system according to claim 1 wherein the control and processing circuitry is configured such that the fixed aperture is a full aperture of the ultrasound array.

11. The system according to claim 1 wherein the control and processing circuitry is configured such that two or more sets of encoded transmit signals are generated by encoding a common set of transmit signals that correspond to a common diverging wave.

12. The system according to claim 1 wherein the control and processing circuitry is configured to generate the sets of encoded transmit signals and beamform the sets of receive signals at a frame rate exceeding 1000 frames per second.

13. The system according to claim 1 wherein the control and processing circuitry is configured such the invertible orthogonal matrix is a Hadamard matrix.

14. The system according to claim 1 wherein the control and processing circuitry is configured such the invertible orthogonal matrix is an S-sequence matrix.

15. A method of performing ultrasound imaging, the method comprising:
delivering encoded transmit signals to an ultrasound array comprising a plurality of ultrasound array elements to sequentially transmit a plurality of diverging ultrasound waves, such that each diverging ultrasound wave is generated by transmitting a respective set of encoded transmit signals to a fixed aperture of the ultrasound array, the fixed aperture consisting of N elements of the ultrasound array;
wherein each set of encoded transmit signals is encoded by a respective row of an N×N invertible orthogonal matrix such that only a selected subset of M rows of the invertible orthogonal matrix is employed to encode the transmit signals, wherein M<N;
detecting receive signals from the ultrasound array in response to the transmitted diverging waves, wherein each set of receive signals is associated with transmission of a respective diverging wave;
decoding the sets of receive signals with a transposed matrix to obtain a plurality of sets of decoded receive signals, wherein the transposed matrix is generated based on the invertible orthogonal matrix such that each set of decoded receive signals is associated with insonification via a subset of the ultrasound array elements in the fixed aperture; and
performing synthetic aperture beamforming on the plurality of sets of decoded receive signals to generate an ultrasound image.

16. The method according to claim 15 wherein each row of the selected subset of M rows of the invertible orthogonal matrix has a lower spatial frequency than the spatial frequencies of the unselected subset of N-M rows of the invertible orthogonal matrix.

17. The method according to claim 15 wherein synthetic aperture beamforming is performed, for a given location, such that at least one given set of decoded receive signals associated with insonification via a given subset of the ultrasound array elements is processed by:
for each ultrasound array element of the given subset of the ultrasound array elements:
determining a set of round-trip times of flight between the ultrasound array element, the location, and the ultrasound array elements of the fixed aperture; and
respectively applying the set of round-trip times of flight to the given set of decoded receive signals;
whereby repeated use of the given set of decoded receive signals for the calculation of times-of-flight on a per-element basis when performing beamforming reduces grating lobe artifacts that would otherwise be associated with grouping array elements during time-of-flight calculations.

18. The method according to claim 15 wherein the form of the invertible orthogonal matrix that is transposed is a sparse matrix comprising:
the selected subset of M rows of the invertible orthogonal matrix; and
N-M zero-padded rows.

19. The method according to claim 15 wherein the full invertible orthogonal matrix is transposed to generate the transposed matrix, and wherein the transposed matrix is multiplied by a zero-padded sparse receive matrix.

20. The method according to claim 15 wherein the form of the invertible orthogonal matrix that is transposed includes only the selected subset of M rows of the invertible orthogonal matrix, and wherein the sets of decoded receive signals are obtained by multiplying the transposed matrix by a receive signal matrix that only includes sets of receive signals that correspond to transmission events.

21. The method according to claim 15 wherein each set of decoded receive signals corresponds to an effective transmit event involving adjacent ultrasound array elements.

22. The method according to claim 15 wherein each set of decoded receive signals corresponds to an effective transmit event involving non-adjacent ultrasound array elements.

23. The method according to claim 15 wherein each set of decoded receive signals corresponds to an effective transmit event involving two ultrasound elements.

24. The method according to claim 15 wherein the fixed aperture is a full aperture of the ultrasound array.

25. The method according to claim 15 wherein two or more sets of encoded transmit signals are generated by encoding a common set of transmit signals that correspond to a common diverging wave.

26. The method according to claim 15 wherein the sets of encoded transmit signals are transmitted and the sets of receive signals are beamformed at a frame rate exceeding 1000 frames per second.

27. The method according to claim 15 wherein the invertible orthogonal matrix is a Hadamard matrix.

28. The method according to claim 15 wherein the invertible orthogonal matrix is an S-sequence matrix.

* * * * *